(12) United States Patent
Sumitomo et al.

(10) Patent No.: US 12,107,250 B2
(45) Date of Patent: Oct. 1, 2024

(54) METHOD FOR PRODUCING ELECTRODE ACTIVE MATERIAL FOR NON-AQUEOUS SECONDARY BATTERY

(71) Applicant: NICHIA CORPORATION, Anan (JP)

(72) Inventors: Takefumi Sumitomo, Anan (JP); Zenji Okabayashi, Tokushima (JP); Mari Yamamoto, Naruto (JP); Hiroaki Takahashi, Yokohama (JP); Akihiro Tokai, Yokohama (JP)

(73) Assignee: NICHIA CORPORATION, Anan (JP)

(*) Notice: Subject to any disclaimer, the term of this patent is extended or adjusted under 35 U.S.C. 154(b) by 552 days.

(21) Appl. No.: 17/310,389

(22) PCT Filed: Jan. 30, 2020

(86) PCT No.: PCT/JP2020/003512
§ 371 (c)(1),
(2) Date: Jul. 30, 2021

(87) PCT Pub. No.: WO2020/158887
PCT Pub. Date: Aug. 6, 2020

(65) Prior Publication Data
US 2022/0102695 A1    Mar. 31, 2022

(30) Foreign Application Priority Data

Feb. 1, 2019   (JP) ................. 2019-017327

(51) Int. Cl.
*H01M 4/36* (2006.01)
*H01M 4/04* (2006.01)
*H01M 4/525* (2010.01)

(52) U.S. Cl.
CPC ......... *H01M 4/0416* (2013.01); *H01M 4/366* (2013.01); *H01M 4/525* (2013.01)

(58) Field of Classification Search
CPC ...... H01M 4/04; H01M 4/0416; H01M 4/366; H01M 4/545; H01M 10/0525
See application file for complete search history.

(56) References Cited

U.S. PATENT DOCUMENTS

| | | | |
|---|---|---|---|
| 6,475,673 B1 | 11/2002 | Yamawaki et al. | |
| 2010/0015524 A1 | 1/2010 | Kim et al. | |
| 2012/0214069 A1 | 8/2012 | Goto et al. | |
| 2015/0333319 A1 | 11/2015 | Kawamura et al. | |
| 2016/0180981 A1 | 6/2016 | Hasegawa et al. | |
| 2017/0288221 A1 | 10/2017 | Kobayashi et al. | |
| 2017/0288222 A1 | 10/2017 | Kobayashi | |

(Continued)

FOREIGN PATENT DOCUMENTS

| | | |
|---|---|---|
| JP | 2000302547 A | 10/2000 |
| JP | 2002075367 A | 3/2002 |

(Continued)

*Primary Examiner* — Kenneth J Douyette
(74) *Attorney, Agent, or Firm* — Hunton Andrews Kurth LLP (57) ABSTRACT

Provided is a method for producing an electrode active material capable of forming a non-aqueous secondary battery with superior durability and output characteristics. The method for producing an electrode active material for a non-aqueous secondary battery includes contacting a dispersion containing graphene and a dispersion medium with alkali-metal-transition-metal composite oxide particles, and the dispersion has a dispersibility index of 0.25 or more.

21 Claims, 4 Drawing Sheets

(56) References Cited

U.S. PATENT DOCUMENTS

| | | |
|---|---|---|
| 2017/0288223 A1 | 10/2017 | Ogawa et al. |
| 2018/0261402 A1 | 9/2018 | Manabe et al. |

FOREIGN PATENT DOCUMENTS

| | | | |
|---|---|---|---|
| JP | 2006012433 A | 1/2006 |
| JP | 2011146390 A | 7/2011 |
| JP | 2013012496 A | 1/2013 |
| JP | 2013058495 A | 3/2013 |
| JP | 2013124965 A | 6/2013 |
| JP | 2017188443 A | 10/2017 |
| JP | 2017188444 A | 10/2017 |
| JP | 2017188445 A | 10/2017 |
| JP | 2017199670 A | 11/2017 |
| JP | 2018174134 A | 11/2018 |
| WO | 2014/115670 A1 | 7/2014 |
| WO | 2016/002261 A1 | 1/2016 |
| WO | 2017/047521 A1 | 3/2017 |

METHOD FOR PRODUCING ELECTRODE ACTIVE MATERIAL FOR NON-AQUEOUS SECONDARY BATTERY

CROSS-REFERENCE TO RELATED APPLICATIONS

This application is a national stage application filed under 35 U.S.C. § 371 based on International Patent Application No. PCT/JP2020/003512, filed on Jan. 30, 2020, which claims priority to Japanese Patent Application No. 2019-017327 filed on Feb. 1, 2019, the disclosures of which are incorporated herein by reference in their entirety.

TECHNICAL FIELD

The present disclosure relates to a method for producing an electrode active material for a non-aqueous secondary battery.

BACKGROUND ART

Non-aqueous electrolyte secondary batteries for use for large power devices, such as electric vehicles, are required to have high output characteristics. To achieve high output characteristics, electrical conductivity of the electrode active material layer is crucial. However, electrode active materials currently practically used may fail to achieve sufficient electrical conductivity. Although such an electrode active material layer typically contains, besides an electrode active material, a conductive aid, such as acetylene black, for improving its electrical conductivity, there is still room for improvement.

In relation to the above, positive electrode active material-graphene composite particles, which are secondary particles obtained by mixing a nanoparticle-size active material and a graphene oxide, and reducing the graphene oxide, have been proposed (refer to, for example, International Patent Publication No. WO 2014/115670).

SUMMARY OF THE INVENTION

Problems to be Solved by the Invention

An aspect of the present disclosure aims to provide a method for producing an electrode active material capable of forming a non-aqueous secondary battery with superior durability and output characteristics.

Means for Solving the Problem

Specific means for solving the problem are as described below, and the present invention encompasses the following aspects. A first aspect is a method for producing an electrode active material for a non-aqueous secondary battery including contacting a dispersion containing graphene and a dispersion medium with alkali-metal-transition-metal composite oxide particles, wherein the dispersion has a dispersibility index of 0.25 or more.

Advantageous Effect of the Invention

According to the first aspect of the present disclosure, a method for producing an electrode active material capable of forming a non-aqueous secondary battery with superior durability and output characteristics may be provided.

MODE FOR CARRYING OUT THE INVENTION

As used herein, the term "step" means not only an independent step but also a step which cannot be clearly distinguished from the other steps but that can achieve the desired object of the step. When a plurality of substances corresponding to a component are present in a composition, the amount of the component means the total amount of the corresponding substances present in the composition unless otherwise specified. The embodiments of the present invention will now be described in detail. However, the embodiments described below are mere examples of the method for producing an electrode active material for a non-aqueous secondary battery and others for embodying the technical concept of the present invention, and the present invention is not limited to the method for producing an electrode active material for a non-aqueous secondary battery and others described below.

Method for Producing Electrode Active Material for Non-Aqueous Secondary Battery The method for producing an electrode active material for a non-aqueous secondary battery includes a contacting step of contacting a dispersion containing graphene and a dispersion medium with alkali-metal-transition-metal composite oxide particles (hereinafter also simply referred to as "composite oxide particles"), wherein the dispersion has a dispersibility index of 0.25 or more.

A dispersion containing graphene and a dispersion medium, and having a dispersibility index of 0.25 or more has a good dispersibility. Contacting such a dispersion with alkali-metal-transition-metal composite oxide particles is believed to reduce graphene's uneven adhesion onto the alkali-metal-transition-metal composite oxide particles. This is believed to reduce metal elution from the alkali-metal-transition-metal composite oxide when included in a non-aqueous secondary battery during charge and discharge of the battery, leading to an improvement in durability of the non-aqueous secondary battery. Also, graphene's less uneven adhesion is believed to improve electrical conductivity of the electrode active material, leading to an improvement in output characteristics of the non-aqueous secondary battery.

A dispersibility index is an evaluation index of the dispersibility of a dispersion, and is measured, for example, in the manner as described below. A dispersion containing graphene as a subject of measurement is prepared using a desired dispersion medium to have a graphene concentration of 3 mg/mL. The dispersion containing graphene is ultrasonic-treated (frequency: 40 kHz, output: 110 W, 20° C.) for 10 min to obtain a primary dispersion. The primary dispersion is immediately (within 1 min) diluted 200-fold to obtain a secondary dispersion with a graphene concentration of 0.015 mg/mL. The secondary dispersion is ultrasonic-treated for 10 min to obtain a dispersion for measurement. The dispersion for measurement is subjected to absorbance measurement at 700 nm using the dispersion medium as a reference within 1 min after obtaining the dispersion for measurement, and the absorbance obtained is used as a dispersibility index. In other words, a dispersibility index is a parameter corresponding to absorbance of a dispersion containing graphene with the predetermined concentration. The dispersibility index of the dispersion is, for example, 0.25 or more, preferably 0.35 or more, more preferably 0.4 or more, and particularly preferably 0.45 or more. The upper limit of the dispersibility index may be, for example, 1 or less, and preferably less than 1, or 0.95 or less. The dispersion medium for measuring a dispersibility index may be any desired organic solvent, and, for example, N-methyl-2-pyrolidone (hereinafter sometimes also abbreviated as NMP) is used.

A dispersion containing graphene and a dispersion medium with a good dispersion stability may further reduce graphene's uneven adhesion. The dispersion stability of a dispersion containing graphene may be evaluated by, for example, the dispersion stability index, which may be measured, for example, in the manner as described below. Using a desired dispersion medium, a dispersion containing graphene as a subject of measurement is prepared to have a graphene concentration of 3 mg/mL. The dispersion containing graphene is ultrasonic-treated (frequency: 40 kHz, output: 110 W, 20° C.) for 10 min to have a primary dispersion. The primary dispersion is centrifuged at 7000 rpm (6300 G) for 5 min, and the supernatant is collected and diluted 200-fold to have a secondary dispersion. The secondary dispersion is ultrasonic-treated (frequency: 40 kHz, output: 110 W, 20° C.) for 10 min to obtain a dispersion for measurement. The dispersion for measurement is subjected to absorbance measurement at 700 nm using the dispersion medium as a reference within 1 min after obtaining the dispersion for measurement, and the absorbance obtained is used as a dispersion stability index. In other words, a dispersion stability index is a parameter corresponding to absorbance of a dispersion containing graphene with a concentration at which graphene may be stably dispersed. The dispersion stability index of the dispersion containing graphene may be, for example, 0.05 or more, and preferably 0.1 or more. The upper limit of the dispersion stability index may be, for example, 1 or less, preferably less than 1, or 0.95 or less. The dispersion medium for measuring a dispersion stability index may be any desired organic solvent, and, for example, NMP is used.

As used herein, examples of graphene to be contained in the dispersion include graphene, graphite, graphene oxides, reduced graphene oxides, intercalation compounds, such as expanded graphite, and graphene precursors, such as ABC- and ABA-stacked graphite. The graphene may be in the form of a sheet or a flake, or flake-shaped particles, such as nanoparticles and flaky particles. Although graphene typically refers to a sheet substance with one atom thickness (single-layer graphene), graphene as used herein encompasses, in addition to single-layer graphene, sheet substances (graphite) composed of a plurality of single-layer graphene sheets stacked by intermolecular forces. The number of the layers is up to about 100.

The graphene to be contained in the dispersion may be selected from commercially available products, or may be prepared by a known method. For example, graphene may be prepared by epitaxial growth, reduction of a graphite oxide, or from a metal-carbon melt. Also, a graphene oxide may be prepared by a known method such as the improved Hummers' method. Graphene may also be prepared by reducing a graphene oxide by heat-treatment.

The concentration of graphene contained in the dispersion may be, for example, 0.1 mass % or more, preferably 1 mass % or more, and more preferably 3 mass % or more. Also, the concentration of graphene may be, for example, 10 mass % or less, preferably 5 mass % or less, and more preferably 4 mass % or less. Graphene contained in the dispersion in a concentration within the above range allows the dispersion to have a viscosity adjustable to a good range when in contact with alkali-metal-transition-metal composite oxide particles.

Graphene to be contained in the dispersion may have an average diameter of, for example, 1000 nm or less, preferably 900 nm or less, and more preferably 800 nm or less. Also, the average diameter is, for example, 100 nm or more, and preferably 300 nm or more. When graphene contained in the dispersion has an average diameter within the above range, the graphene may further less unevenly adhere onto alkali-metal-transition-metal composite oxide particles. The average diameter of graphene is determined as the volume average diameter, which is the particle diameter at cumulative 50% from the small diameter side in a volume-based cumulative particle size distribution measured in wet condition using a dynamic light-scattering particle size distribution measuring device.

Graphene to be contained in the dispersion may contain oxygen in its composition. Graphene containing oxygen in its composition may have an oxygen content of, for example, 10 atomic % or less, preferably 7 atomic % or less, and more preferably 3 atomic % or less. Also, the oxygen content may be, for example, 0.1 atomic % or more, and preferably 0.5 atomic % or more. When graphene contained in the dispersion has an oxygen content within the above range, sufficient electrical conductivity may be imparted, and reaction between oxygen contained in graphene and an electrolyte during charge and discharge may be reduced. The oxygen content of graphene may be measured using an X-ray photoelectron spectrometer (XPS).

Graphene to be contained in the dispersion may have a specific surface area of, for example, from 20 $m^2/g$ to 1000 $m^2/g$, and preferably from 100 $m^2/g$ to 700 $m^2/g$. When graphene contained in the dispersion has a specific surface area within the above range, the graphene may further less unevenly adhere onto alkali-metal-transition-metal composite oxide particles. The specific surface area is measured by, for example, the BET method using nitrogen gas.

For the dispersion medium to be contained in the dispersion containing graphene, for example, a solvent such as an organic solvent is used. Specific examples of the organic solvent include low-polar aromatic solvents, such as orthodichlorobenzene (hereinafter also abbreviated as ODCB), 1,2,4-trichlorobenzene, and mesitylene; ester solvents, such as butyl butyrate; ketone solvents, such as diisopropylketone; nitrile solvents, such as acetonitrile and isobutyronitrile; carbonic acid ester solvents, such as ethylene carbonate and propylene carbonate; and amide solvents, such as NMP.

For the dispersion medium to be contained in the dispersion containing graphene, solvents with a donor number of 30 or less may be used, and in consideration of solubility of the binder described below, the donor number is preferably 2.5 or more, more preferably 25 or more, and preferably 29 or less. The lower limit of the donor number of the solvent is, for example, preferably 3 or more, or 25 or more. Here, the donor number of a solvent refers to the electron donating index of the solvent molecules, which is described in, for example, "Donors and Acceptors" written by V. Gutmann, published by Gakkai Shuppan Center (1900). Examples of solvents with a donor number of 30 or less include NMP (27.3), propylene carbonate (15.1), isobutyronitrile (15.4), and ODCB (3.0). Exemplary donor numbers are shown in the parentheses. Among them, in consideration of the binder solubility described below, NMP is preferable as a dispersion medium with a donor number of 30 or less.

The dispersion medium to be contained in the dispersion containing graphene may have a surface tension at 25° C. of, for example, 50 mN/m or less, and preferably 45 mN/m or less. Also, the surface tension of the solvent may be, for example, 35 mN/m or more, and preferably 40 mN/m or more. A solvent with a surface tension within the above range tends to allow graphene to be more finely dispersed. Specific examples include ODCB and NMP. Among them, in consideration of the binder solubility described below, NMP is preferable as a dispersion medium with a surface tension at 25° C. of 50 mN/m or less.

A dispersion containing graphene may be prepared by dispersion-treating raw graphene in a solvent. Graphene may be dispersion-treated by, for example, mixing raw graphene and a solvent. For mixing, a common mixing method may be used. Specific examples include methods using a stirrer equipped with, for example, a stirring blade or a magnetic stirrer, and methods using, for example, a ball mill. For example, when using a ball mill, the mixing time may be, for example, from 1 hour to 36 hours. The temperature during mixing may be, for example, from 20° C. to 50° C.

In the dispersion-treatment of graphene, energy may be applied as necessary. Energy may be applied through, for example, microwave irradiation, heat treatment, ultrasonic treatment, in-liquid plasma treatment, and grinding and shearing using a ball mill, a jet mill, a pressure homogenizer, or supercritical treatment. Of these, methods that apply gentle shear forces, such as ball-milling using nylon balls, are preferable. When applying energy, for example, an ionic liquid or an anionic polymer may also be co-present. An example of the ionic liquid is an imidazolium ionic liquid (refer to Nature Chemistry, 7, 730-736 (2015)). Examples of the anionic polymer include poly(meth)acrylate salts (conjugate base of poly(meth)acrylic acid), poly(styrene sulfonic acid) salts (conjugate base of PSS), and Nafion (registered trademark). When applying energy, the time taken for applying energy may be selected according to the purpose of applying energy, the method of applying energy, and other factors.

Examples of the raw graphene include graphene, graphite, graphene oxides, reduced graphene oxides, intercalation compounds, such as expanded graphite, and graphene precursors, such as ABC-stacked graphite. The graphene may be in the form of a sheet or a flake, or flake-shaped particles, such as nanoparticles and flaky particles. Although graphene generally refers to a sheet substance with one atom thickness (single-layer graphene), graphene as used herein encompasses, in addition to single-layer graphene, sheet substances (graphite) composed of a plurality of single-layer graphene sheets stacked by intermolecular forces. The number of the layers is up to about 100.

As raw graphene, for example, graphene with an average diameter of more than 1000 nm may be used. The average diameter of the raw graphene may be preferably 2 µm or more, and may, for example, 100 µm or less, and preferably 50 µm or less. Graphene with an average diameter within the above range tends to be more finely dispersed. The average diameter of the raw graphene is determined as the volume average diameter, which is the particle diameter at cumulative 50% from the small diameter side in a volume-based cumulative particle size distribution measured in wet condition using a dynamic light-scattering particle size distribution measuring device.

The raw graphene may contain oxygen in its composition. When containing oxygen in its composition, the raw material graphene may have an oxygen content of, for example, 10 atomic % or less, preferably 7 atomic % or less, and more preferably 3 atomic % or less. Also, the oxygen content may be, for example, 0.1 atomic % or more, and preferably 0.5 atomic % or more. When raw graphene contained in the dispersion has an oxygen content within the above range, sufficient electrical conductivity may be imparted, and reaction between oxygen contained in graphene and an electrolyte during charge and discharge may be reduced.

The specific surface area of raw graphene may be, for example, from 20 $m^2/g$ to 1000 $m^2/g$, and preferably from 100 $m^2/g$ to 700 $m^2/g$. When raw graphene has a specific surface area within the above range, graphene tends to be more finely dispersed. A specific surface area is measured by, for example, the BET method using nitrogen gas.

Raw material graphene may be selected from commercially available products, or may be prepared by a known method. For example, graphene may be produced by epitaxial growth, reduction of a graphite oxide, or from a metal-carbon melt. Also, a graphene oxide may be prepared by a known method such as the improved Hummers' method. Graphene may also be prepared by reducing a graphene oxide by heat-treatment.

For the solvent to be used for dispersing graphene, solvents with a donor number of 30 or less may be used, and in consideration of solubility of the binder described below, the donor number is preferably 2.5 or more, more preferably 25 or more, and preferably 29 or less. As used herein, the donor number of a solvent refers to an electron donating index of solvent molecules, which is described in, for example, "Donors and Acceptors" by V. Gutmann, published from Gakkai Shuppan Center (1900). Examples of solvents with a donor number of 30 or less include NMP (27.3), propylene carbonate (15.1), isobutyronitrile (15.4), and ODCB (3.0). Exemplary donor numbers are shown in the parentheses. Among them, in consideration of the binder solubility described below, NMP is preferable as a solvent with a donor number of 30 or less.

The solvent to be used for dispersing graphene may have a surface tension at 25° C. of 50 mN/m or less, and preferably 45 mN/m or less. Also, the surface tension of the solvent is, for example, 35 mN/m or more, and preferably 40 mN/m or more. A solvent with a surface tension within the above range tends to disperse graphene more finely. Specific examples include ODCB and NMP. Among them, in consideration of the binder solubility described below, NMP is preferable as a solvent with a surface tension at 25° C. of 50 mN/m or less.

In the dispersion-treatment of graphene, dispersants, oxidants, and other dispersing aids may be used. Examples of the dispersants include commonly used dispersants, such as anionic dispersants, cationic dispersants, and nonionic dispersants. As an oxidant, for example, a one-electron oxidant having a predetermined oxidation-reduction potential may be used.

The oxidation-reduction potential of the one-electron oxidant may be, for example, from 0.2 V to 1.9 V. The oxidation-reduction potential of the one-electron oxidant may be preferably 0.3 V or more, and more preferably 0.4 V or more in consideration of reactivity with a solvent having a donor number of 30 or less described below. Also, the oxidation-reduction potential of the one-electron oxidant may be preferably less than 1.9 V, more preferably 1.2 V or less, and even more preferably 0.6 V or less. The one-electron oxidant may be, for example, a peroxide such as hydrogen peroxide, or a salt compound including a cation and an anion. The cation may be, for example, a carbocation or an aminium cation in consideration of oxidation-reduction potential. The carbocation may be, for example, a triarylmethyl cation, and the aminium cation may be, for example, a triarylaminium radical cation. The three aryl groups included in the triaryl cation or triarylaminium radical cation may be the same or different. Examples of the aryl group include aromatic hydrocarbon groups having 6 to 20 carbons, and preferably 6 to 10. The aryl group may have one or more substituents, and examples of the substituents include alkyl groups having 1 to 12 carbons, alkenyl groups having 1 to 12 carbons, alkyloxy groups having 1 to 12 carbons, and halogen atoms. Two or more substituents on the aryl group may be connected to each other to form a fused ring structure.

Specific examples of carbocations include triarylmethyl cations, such as triphenylmethyl cation and tris(4-bromophenyl)methyl cation. Also, specific examples of aminium cations include triarylaminium radical cations, such as triphenylaminium radical cation, tris(4-bromophenyl)aminium radical cation, and tris(2,4-dibromophenyl)aminium radical cation. Among them, triarylmethyl cation is preferable in consideration of solubility in solvents with a predetermined number of donors as described below.

The anions forming the one-electron oxidant may be, for example, fluorinated anions containing fluorine atoms in consideration of the stability of the modified graphene. Examples of the fluorinated anions include anions, such as tetrafluoroborate ($BF_4^-$), hexafluorophosphate ($PF_6^-$), hexafluoroantimonate ($SbF_6^-$), bis(trifluoromethanesulfonyl) ($SbF_6^-$), bis(trifluoromethanesulfonyl)imide ($TFSI^-$), and tetrakis(pentafluorophenyl)borate. Among them, tetrafluoroborate is preferable in consideration of the dispersibility of graphene in a dispersion medium.

Graphene may be dispersion-treated by contacting a one-electron oxidant and the raw graphene described above in the presence of a solvent as described above. When a one-electron oxidant is used for a dispersion containing graphene, the mass ratio of the one-electron oxidant to graphene may be, for example, from 0.1 to 20, and preferably from 1 to 10. When a solvent is used, the mass ratio of the solvent to the carbon material may be, for example, from 10 to 600, and preferably from 50 to 450.

The atmosphere during the contact between graphene and the one-electron oxidant may be an inert gas atmosphere, such as argon and nitrogen, preferably with an oxygen concentration of, for example, 5 ppm or less.

The time taken for contacting graphene and the one-electron oxidant may be from 1 to 7 days, for example, at room temperature. The contact between graphene and the one-electron oxidant may further include a step of applying energy as necessary. Applying energy may further improve the dispersibility of the graphene.

When a dispersion containing graphene is prepared by contacting graphene and a one-electron oxidant, the resulting dispersion containing graphene may contain, for example, a modified graphene containing a positive hole formed by electron withdrawal by the one-electron oxidant and an anion that compensates for the charge. In other words, the dispersion containing graphene may contain positive hole-doped graphene and an anion that forms a charge pair with it. A dispersion containing graphene containing a modified graphene further improves the dispersion stability of the dispersion containing graphene.

The modified graphene may have a different zeta potential from graphene untreated with the one-electron oxidant. For example, the zeta potential of the modified graphene may be −50 mV or less in NMP, and may be at least 15 mV lower than that of graphene before being modified.

After obtaining a dispersion containing graphene by the dispersion-treatment, the graphene or modified graphene contained in the dispersion may be separated. For example, when the dispersion-treatment is carried out in a solvent, solid-liquid separation may be carried out after contact. The solid-liquid separation may be carried out by filtration using, for example, a membrane filter, or by sedimentation of the solids and removal of the supernatant. The solids obtained by solid-liquid separation may be washed with an organic solvent as necessary. Examples of the organic solvent used for washing include the aromatic solvents described above, amide solvents, such as NMP, and nitrile solvents, such as acetonitrile.

The graphene or modified graphene obtained by the dispersion-treatment may be collected as powder by drying treatment, or the separated graphene or modified graphene may be re-dispersed in a desired organic solvent to form a dispersion containing graphene.

In the method for producing a positive electrode active material for a non-aqueous secondary battery, the dispersion containing graphene described above and alkali-metal-transition-metal composite oxide particles are contacted to obtain a positive electrode active material for a non-aqueous secondary battery. The resulting positive electrode active material for a non-aqueous secondary battery is believed to contain alkali-metal-transition-metal composite oxide particles on at least a part of the surfaces of which graphene is disposed. The graphene may be adhered onto the surfaces of the alkali-metal-transition-metal composite oxide particles, or may cover at least a part of the surfaces.

The dispersion containing graphene and the composite oxide particles may be contacted, for example, by wet-mixing the dispersion containing graphene and the composite oxide particles. The mixing is carried out using a common mixing method, such as stirring blades and homogenizers. A desired organic solvent may be used for the mixing as necessary.

The dispersion containing graphene and the composite oxide particles may be contacted in a ratio of the solid content of the dispersion containing graphene to the mass of the composite oxide particles of, for example, 0.01 mass % or more, preferably 0.1 mass % or more, more preferably 0.2 mass % or more, and even more preferably 0.4 mass % or more. Also, in consideration of energy density, the ratio relative to the mass of the composite oxide particles may be, for example, 10 mass % or less, preferably 2.5 mass % or less, more preferably 1 mass % or less, even more preferably 0.7 mass % or less, still more preferably 0.6 mass % or less, and especially preferably 0.5 mass % or less. The temperature during the contact may be, for example from 20° C. to 70° C. The time taken for the contact may be, for example, from 1 min to 3 hours.

After contacting the dispersion containing graphene and the composite oxide particles, treatments, such as solid-liquid separation, drying treatment, purification treatment, and classification treatment may be carried out as necessary.

The composite oxide particles used for the contact only need to contain at least a composite oxide capable of forming either a positive electrode or a negative electrode. Examples of the composite oxide capable of forming a positive electrode include alkali metal-cobalt composite oxides, alkali metal-nickel composite oxides, alkali metal-nickel-cobalt-manganese composite oxides, spinel-structured alkali metal-manganese composite oxides, and olivine-structured iron alkali metal phosphate. The alkali metal may be any of, for example, lithium, sodium, or potassium.

Such a composite oxide capable of forming a positive electrode may be obtained by a known method. For example, such a composite oxide may be produced by a production method including mixing an alkali metal compound with an oxide having a desired composition to obtain a mixture of raw materials, and heat-treating the mixture of raw materials. The heat-treated material obtained through the heat treatment may undergo crushing treatment, or may undergo treatments for removing unreacted substances, byproducts, and others by, for example, washing with water, or may further undergo dispersion and classification treatments.

Examples of the method described above for obtaining an oxide with a desired composition include the method of mixing raw material compounds (e.g., hydroxides and carbonate compounds) according to the desired composition and decomposing them into an oxide by heat treatment; and the coprecipitation method of dissolving solvent-soluble raw material compounds in a solvent, precipitating precursors according to the desired composition by, for example, temperature adjustment, pH adjustment, and input of complexing agents, and then heat treating the resulting precursors to obtain an oxide.

A layer-structured alkali-metal-transition-metal composite oxide, such as an alkali metal-cobalt composite oxide, is preferable because such an oxide facilitates obtaining a non-aqueous secondary battery with a good balance of, for example, charge-discharge capacity and energy density. The alkali-metal-transition-metal composite oxide may contain at least an alkali metal, such as lithium, and a transition metal, such as nickel, and may further contain at least one of aluminum, cobalt, or manganese.

When the alkali-metal-transition-metal composite oxide contains nickel, the ratio of the number of moles of nickel to the total number of moles of metals other than alkali metals may be, for example, 0.33 or more, preferably 0.4 or more, and more preferably 0.55 or more. The upper limit of the ratio of the number of moles of nickel may be, for example, less than 1, preferably 0.98 or less, more preferably 0.8 or less, and even more preferably 0.6 or less. When the ratio of the number of moles of nickel is within the above range, both charge-discharge capacity and cycle characteristics at high voltage may be achieved in a non-aqueous electrolyte secondary battery.

When the alkali-metal-transition-metal composite oxide contains cobalt, the ratio of the number of moles of cobalt to the total number of moles of metals other than alkali metals may be, for example, 0.02 or more, preferably 0.05 or more, more preferably 0.1 or more, and even more preferably 0.15 or more. The upper limit of the ratio of the number of moles of cobalt may be, for example, less than 1, preferably 0.33 or less, more preferably 0.3 or less, and even more preferably 0.25 or less. When the ratio of the number of moles of cobalt is in the above range, sufficient charge-discharge capacity at high voltage can be achieved in a non-aqueous electrolyte secondary battery.

When the alkali-metal-transition-metal composite oxide contains manganese, the ratio of the number of moles of manganese to the total number of moles of metals other than alkali metals may be, for example, 0.01 or more, preferably 0.05 or more, more preferably 0.1 or more, and even more preferably 0.15 or more. The upper limit of the ratio of the number of moles of manganese may be, for example, 0.33 or less, preferably 0.3 or less, and more preferably 0.25 or less. When the ratio of the number of moles of manganese is within the above range, both charge-discharge capacity and safety may be achieved in a non-aqueous electrolyte secondary battery.

The ratio of the number of moles of alkali metals to the total number of moles of metals other than alkali metals in the alkali-metal-transition-metal composite oxide may be, for example, 1.0 or more, preferably 1.03 or more, and more preferably 1.05 or more. The upper limit of the ratio of the number of moles of alkali metals may be, for example, 1.5 or less, and preferably 1.25 or less.

When the alkali-metal-transition-metal composite oxide contains cobalt and manganese in addition to nickel, the mole ratio of nickel, cobalt, and manganese may be, for example, nickel:cobalt:manganese=(from 0.33 to 0.95):(from 0.02 to 0.33):(from 0.01 to 0.33), and preferably (from 0.55 to 0.6):(from 0.15 to 0.25):(from 0.15 to 0.3).

The alkali-metal-transition-metal composite oxide may be, for example, an alkali-metal-transition-metal composite oxide having a composition represented by the formula below:

where p, x, y, z, and α satisfy $1.0 \leq p \leq 1.3$, $0 \leq x \leq 1$, $0 \leq y \leq 1$, $0 \leq z \leq 1$, $x+y+z=1$, and $-0.1 \leq \alpha \leq 0.1$; A denotes at least one selected from the group consisting of Li, Na, and K; and $M^1$ denotes at least one of Mn and Al.

Examples of composite oxides capable of forming a negative electrode include lithium titanates (e.g., $Li_4Ti_5O_{12}$, $LiTi_2O_4$), lithium titanium composite oxides (e.g., $Li_4Ti_{5-x}Mn_xO_{12}$: $0<x\leq0.3$), lithium metal oxides (e.g., $Li_xM_yO_z$: M=Sn, Cu, Pb, Sb, Zn, Fe, In, Al, or Zr), and lithium metal sulfides (e.g., $Li_xM_yS_z$:M=Ti, Sn, Cu, Pb, Sb, Zn, Fe, In, Al, or Zr). In these, lithium may be replaced by other alkali metals. For these composite oxides, the items and production methods described in, for example, Japanese Unexamined Patent Application Publications No. 2000-302547, No. 2013-012496, or No. 2013-058495 may be used as appropriate.

The composite oxide particles may include doped elements other than the elements forming the composite oxide.

Example of the elements to be doped include B, Mg, Al, Si, P, S, Ca, Ti, V, Cr, Zn, Sr, Y, Zr, Nb, Mo, In, Sn, Ba, La, Ce, Nd, Sm, Eu, Gd, Ta, W, and Bi. Examples of compounds used for doping these elements include oxides and fluorides containing at least one selected from the group consisting of these elements, and alkali metal composite oxides thereof. The doping amount may be, for example, from 0.005 mol % to 10 mol % relative to the alkali-metal-transition-metal composite oxide particles.

The composite oxide particles each may have a core particle containing the metal composite oxide and an adhered substance onto the surface of the core particle. The adhered substances need only be disposed on at least a part of the surfaces of the core particles, and preferably disposed on 1% or more of the surface area of the core particles. The composition of the adhered substance is selected according to, for example, the purpose, and the examples include oxides and fluorides containing at least one selected from the group consisting of Li, B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi, and alkali metal composite oxides thereof. The amount of the adhered substance may be, for example, from 0.03 mass % to 10 mass % in the alkali-metal-transition-metal composite oxide particles, and preferably from 0.1 mass % to 2 mass %.

The average diameter of the composite oxide particles may be, for example, from 1 μm to 40 μm as the volume average particle diameter, preferably 1.5 μm or more, more preferably 3 μm or more, and also preferably 30 μm or less, and more preferably 20 μm or less in consideration of output characteristics.

The lower limit of the ratio of the average diameter of the carbon material to the average diameter of the composite oxide particles (carbon material/composite oxide particles) may be, for example, 0.01 or more, and preferably 0.1 or more. The upper limit of the ratio of the average diameter of the carbon material to the average diameter of the composite oxide particles (carbon material/composite oxide particles) may be, for example, 10 or less, and preferably 2 or less.

The composite oxide particles may be agglomerated particles consisting of a large number of primary particles, or they may be what is referred to as single particles consisting of, for example, six or fewer primary particles. The composite oxide particles may have a ratio of the 50% particle diameter $D_{50}$ a volume-based cumulative particle size distribution to the average particle diameter $D_{SEM}$ based on electron microscopy, or $D_{50}/D_{SEM}$, of from 1 to 6.

In the composite oxide particles, the average particle diameter $D_{SEM}$ based on electron microscopy may be, for example, from 0.1 μm to 20 μm in consideration of durability, and in consideration of power density and electrode plate filling properties, preferably 0.3 μm or more, more preferably 0.5 μm or more, and also preferably 15 μm or less, more preferably 10 μm or less, and particularly preferably 5 μm or less.

The average particle diameter $D_{SEM}$ based on electron microscopy is the average sphere-equivalent diameter of primary particles measured using scanning electron microscope (SEM) images. The mean particle diameter $D_{SEM}$ is specifically measured as follows. A scanning electron microscope (SEM) is used to observe the particles in the range of from 1000× to 10000× according to the particle diameter. 100 primary particles with discernible outlines are selected and the lengths of the outlines of the selected primary particles are determined by tracing the outlines of the particles using image processing software. The spherical equivalent diameters are calculated from the lengths of the outlines, and the average particle diameter $D_{SEM}$ is obtained as the arithmetic mean of the obtained spherical equivalent diameters.

If the composite oxide particles have a $D_{50}/D_{SEM}$ of 1, the composite oxide particles consist of single primary particles. The number of primary particles becomes fewer as $D_{50}/D_{SEM}$ becomes closer to 1. In consideration of durability, $D_{50}/D_{SEM}$ is preferably from 1 to 6, and in consideration of power density, $D_{50}/D_{SEM}$ is preferably 5 or less, and particularly preferably 3 or less.

Also, the 50% particle diameter $D_{50}$ of the composite oxide particles may be, for example, from 1 μm to 30 μm, and is, in consideration of power density, preferably 1.5 μm or more, more preferably 3 μm or more, and also preferably 10 μm or less, and more preferably 5.5 μm or less.

The 50% particle diameter $D_{50}$ is determined as the particle diameter corresponding to cumulative 50% from the small diameter side in a volume-based cumulative particle size distribution measured in wet conditions using a laser diffraction particle diameter analyzer. Similarly, the 90% particle diameter $D_{90}$ and the 10% particle diameter $D_{10}$, which are described later, are determined as the particle diameters corresponding to cumulative 90% and 10% from the small diameter side, respectively.

The ratio of 90% particle diameter $D_{90}$ to 10% particle diameter $D_{10}$ in a volume-based cumulative particle size distribution indicates the spread of the particle size distribution of the composite oxide particles, and a smaller value indicates a more uniform particle diameter. For example, the $D_{90}/D_{10}$ of the composite oxide particles may be 8 or less, and is, in consideration of power density, preferably 6 or less, and more preferably 3 or less. The lower limit of $D_{90}/D_{10}$ may be, for example, 1.2 or more.

For the composite oxide particles with a $D_{50}/D_{SEM}$ of from 1 to 6, refer to, for example, Japanese Unexamined Patent Application Publications No. 2017-188443, No. 2017-188444, and No. 2017-188445.

The alkali-metal-transition-metal composite oxide may contain nickel in its composition. In consideration of initial efficiency in a non-aqueous electrolyte secondary battery, the alkali-metal-transition-metal composite oxide may have a nickel element disorder determined by X-ray diffraction of, for example, 4.0% or less, preferably 2.0% or less, and more preferably 1.5% or less. Here, the disorder of nickel elements means the chemical disorder of transition metal ions (nickel ions) that should occupy the original sites. In alkali-metal-transition-metal composite oxides with a layered structure, the alkali metal ions that should occupy the sites denoted by Wyckoff symbols 3b (3b sites, hereinafter) are typically replaced by transition metal ions that should occupy 3a sites. A smaller disorder of the nickel element leads to a better initial efficiency, and thus is preferable.

The disorder of the nickel element in the alkali-metal-transition-metal composite oxides may be determined by X-ray diffraction. The X-ray diffraction spectra of the alkali-metal-transition-metal composite oxides are measured using CuKα rays. The composition model is represented by $(Li_{1-d}Ni_d)(Ni_xCo_yMn_zAl_w)O_2$ (x+y+z+w=1), and the structural optimization was carried out using Rietveld analysis based on the obtained X-ray diffraction spectra. The percentage of d calculated as a result of the structural optimization is used as the disorder value of the nickel element.

Electrode Active Material for Non-Aqueous Secondary Battery

An aspect of the electrode active material for a non-aqueous secondary battery includes alkali-metal-transition-metal composite oxide particles with graphene being disposed on at least a part of the surfaces of the particles, obtained by contacting the alkali-metal-transition-metal composite oxide particles with a dispersion containing graphene and a dispersion medium and having a dispersibility index of 0.25 or more. The graphene may be adhered onto the surface of the alkali-metal-transition-metal composite oxide particles, or may cover the surface. In other words, the alkali-metal-transition-metal composite oxide particles with graphene being disposed on at least a part of the surfaces of the particles, which are obtained by contacting alkali-metal-transition-metal composite oxide particles and a dispersion having good dispersibility, have graphene adhered less unevenly onto the surfaces of the alkali-metal-transition-metal composite oxide particles, allowing less elution of metal components contained in the alkali-metal-transition-metal composite oxide during charge and discharge. Thus, the durability of a non-aqueous secondary battery including the electrode active material is believed to improve. Also, since the electrical conductivity of the electrode active material improves with less uneven graphene adhesion, the output characteristics of a non-aqueous secondary battery including the electrode active material are expected to improve.

In consideration of electrical conductivity, the amount of graphene in the electrode active material relative to the composite oxide particles may be, for example, 0.01 mass % or more, preferably 0.1% or more, more preferably 0.2% or more, and even more preferably 0.4% or more. Also, in consideration of energy density, the amount relative to the composite oxide particles may be, for example, 10 mass % or less, preferably 2.5 mass % or less, more preferably 1 mass % or less, even more preferably 0.7 mass % or less, still more preferably 0.6 mass % or less, and particularly preferably 0.5 mass % or less.

Electrodes Composition for Non-Aqueous Secondary Battery

An electrode composition for a non-aqueous secondary battery may contain the electrode active material described above and a binder, and may further contain, for example, a conductive aid, a filler, and an organic solvent as necessary.

The binder is a material that helps adhesion of the electrode active material and a conductive aid and other materials, and helps adhesion of the electrode active material to the current collector. Examples of the binder include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylenepropylene-diene rubber (EPDM), sulfonated EPDM, styrene-butylene rubber, flour rubber, and various copolymers. The amount of the binder may be, for example, from 0.05 mass % to 50 mass % relative to the total mass of the electrode composition.

The conductive aid is a material that improves, for example, the electrical conductivity of the electrode active material layer. Modified graphene is an example of a conductive aid. Other examples include graphite, such as natural graphite and artificial graphite; carbon blacks, such as carbon black, acetylene black, ketene black, channel black, furnace black, lamp black, and summer black; conductive fibers, such as carbon fiber and metal fiber; carbon materials, such as graphene and carbon nanotubes; fluorocarbon; metal powders, such as aluminum and nickel powders; conductive whiskers, such as zinc oxide and potassium titanate; conductive metal oxides, such as titanium oxide; and conductive materials, such as polyphenylene derivatives. The amount of the conductive aid may be, for example, from 0.5 mass % to 30 mass % relative to the total mass of the electrode composition.

When the electrode composition contains other conductive aids besides modified graphene, the lower limit of the content ratio of the modified graphene to the other conductive aids in the electrode composition (modified graphene/other conductive aids) may be, for example, $1/1000$ or more, preferably $1/100$ or more, and more preferably $1/10$ or more. The upper limit of the content ratio of the modified graphene to the other conductive agents in the electrode composition may be, for example, 100/1 or less, preferably 10/1, and more preferably 1/1 or less.

The filler is a material that inhibits, for example, the expansion of the electrode active material layer. Examples of the filler include lithium carbonate; olefinic polymers, such as polyethylene and polypropylene; and fibrous materials, such as glass fiber and carbon fiber.

The electrode composition may contain an organic solvent. An example of the organic solvent is NMP.

Electrode for Non-Aqueous Secondary Battery

The electrode for a non-aqueous secondary battery includes a current collector and an electrode active material layer containing the electrode active material for a non-aqueous secondary battery described above and is placed on the current collector. The electrode is produced by dispersing the electrode composition described above in a solvent such as NMP to form a slurry, and applying the slurry on the current collector, followed by drying and pressing.

Examples of the current collector include metals, such as copper, stainless steel, aluminum, nickel, and titanium; calcined carbon; composites of copper or stainless steel that are surface-treated with, for example, carbon, nickel, titanium, or silver; and aluminum-cadmium alloys. Forming minute irregularities on the surface of the current collector may also enhance its adhesive strength with the electrode active material layer and others. A variety of forms are possible, such as film, sheet, foil, net, porous material, foam, and non-woven material. The thickness of the current collector may be, for example, from 3 μm to 500 μm.

The electrode for a non-aqueous secondary battery including the electrode active material described above may have a lower electrode plate resistance. The rate of reduction of the electrode plate resistance in the electrode for a non-aqueous secondary battery may be, for example, 40% or more, preferably 50% or more, more preferably 60% or more, and particularly preferably 70% or more in consideration of output characteristics. The upper limit of the rate of reduction may be, for example, 99% or less, and preferably 95% or less. The rate of reduction of the electrode resistance is determined by the method described below using an electrode including acetylene black instead of graphene in the electrode active material of this embodiment as a reference.

Non-Aqueous Secondary Battery

The non-aqueous secondary battery includes at least one of the above electrodes for a non-aqueous secondary battery. In addition to the electrode for a non-aqueous secondary battery, the non-aqueous secondary battery includes an electrode that pairs with the electrode for a non-aqueous secondary battery, a non-aqueous electrolyte, and a separator. The electrode to be paired may be the electrode for a non-aqueous secondary battery mentioned above. For the electrode to be paired, the non-aqueous electrolyte, the separator and others in the non-aqueous secondary battery, the materials for a non-aqueous secondary battery described in, for example in Japanese Unexamined Patent Application Publications No. 2002-075367, No. 2011-146390, No. 2006-12433, and No. 2000-302547 (U.S. Pat. No. 6,475,673), No. 2013-058495 (U.S. Patent Application Publication No. 2010/015524) may be used as appropriate. These documents are incorporated herein by reference in their entirety.

The above-described electrolyte contains, for example, fluorine-containing anions. Specifically, lithium salts containing fluorine-containing anions, such as $LiPF_6$, $LiBF_4$, $LiSbF_6$, $LiAsF_6$, $LiSO_3CF_3$, or $LiN(SO_2CF_3)_2$ may be used alone or in combination of two or more of them.

Dispersion Containing Graphene

The dispersion containing graphene contains graphene and a dispersion medium, and has a dispersibility index of 0.25 or more. Details of the graphene and the dispersion medium included in the dispersion containing graphene, as well as details of the dispersibility index, are as described. The dispersion containing graphene may be obtained by dispersion-treating the raw graphene, or may include modified graphene obtained by contacting the raw graphene with a one-electron oxidant.

EXAMPLES

The invention will now be described in detail by means of examples, but the invention is not limited to these examples.

Average Diameter

The average diameter of graphene was measured by using a dynamic light-scattering particle size distribution analyzer (ELSZ-2000ZS by Otsuka Electronics).

Preparation of Dispersion a Containing Graphene 2 g of raw graphene (rGO by Angstron, BET specific surface area: 600 $m^2/g$, oxygen content: 1.8 atomic %) was added to dry N-methyl-2-pyrrolidone (hereinafter NMP, donor number: 27, surface tension: 41 mN/m, purity: >99.0%) to have a graphene concentration of 30 mg/mL, and ultrasonic-treated (frequency: 40 kHz, power: 110 W, 20° C.) for 1 hour to obtain a dispersion A.

The dispersion A obtained above was adjusted with NMP to have a graphene concentration of 3 mg/mL. The adjusted solution was ultrasonic-treated (frequency: 40 kHz, output: 110 W, 20° C.) for 10 min to obtain a homogeneous primary dispersion. The dispersion was then diluted 200-fold to obtain a secondary dispersion with a graphene concentration of 0.015 mg/mL. The dispersion was then ultrasonic-treated (frequency: 40 kHz, power: 110 W, 20° C.) for 10 min to obtain a homogeneous dispersion for measurement. The absorbance of this dispersion for measurement was measured (U-4100 spectrophotometer by Hitachi High-Technologies) at 700 nm using NMP as a reference, and the absorbance obtained was used as the dispersibility index, which was 0.24. The average diameter and a zeta potential of the dispersion for measurement were measured (ELSZ-2000ZS by Otsuka Electronics); the graphene had an average diameter of 6540 nm, a standard deviation of 4001, and a zeta potential of −37 mV.

The primary dispersion obtained in the dispersibility index measurement described above was centrifuged at a rotation speed of 7,000 rpm (6,300 G) for 5 min, and the supernatant was collected and diluted 200-fold to obtain a secondary dispersion. The secondary dispersion was ultrasonic-treated (frequency: 40 kHz, output: 110 W, 20° C.) for 10 min to obtain a homogeneous dispersion for measurement. Absorbance measurement was performed to determine the absorbance at 700 nm (based on NMP as a reference). The absorbance of the dispersion for measurement was measured (U-4100 spectrophotometer by Hitachi High-Technologies) at 700 nm using NMP as a reference, and the obtained absorbance was used as the dispersion stability index, which was 0.

Figure 1:
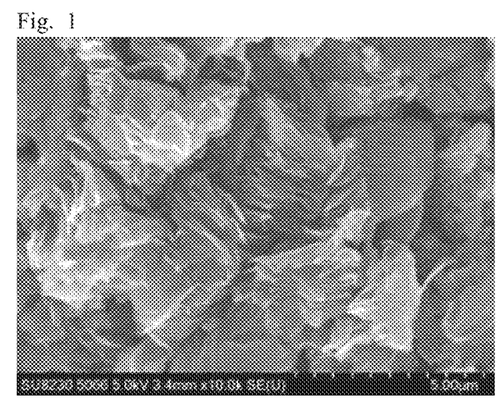
FIG. 1 is an exemplary scanning electron microscope (SEM) image of graphene contained in a dispersion A.

The graphene in the dispersion A was observed using a scanning electron microscope (Hitachi High-Technologies SU8230; accelerating voltage: 5 kV). The SEM image is shown in FIG. 1 (magnification: 10000×).

Preparation of Dispersion B 64 mL of dry NMP, 2 g of the same raw graphene as the one used in the dispersion A, and 100 nylon balls (ϕ10 mm) were added into a planetary ball mill container under an argon atmosphere at room temperature in a glove box where the oxygen concentration was adjusted to 3.0 ppm or less. The lid of the container was then closed, and the container was removed from the glove box. Subsequently, planetary ball milling (rotation speed: 400 rpm) was performed for 36 hours. Filtration was then performed using a Teflon (registered trademark) membrane filter with a pore diameter of 0.1 μm under pump suction. After filtration, the filter was washed with NMP. The resulting filtrate was added to an NMP solution to have a graphene concentration of 30 mg/mL, which was used as a dispersion B. The average diameter of the dispersion B was measured in the same manner as for the dispersion A. The average diameter was 578 nm with a standard deviation of 239, demonstrating that the dispersion B has a smaller average diameter and a narrower particle size distribution.

The dispersibility index and dispersion stability index of the dispersion B were determined in the same manner as the dispersion A. The dispersibility index was 0.41, and the dispersion stability index was 0, demonstrating that the dispersion B has improved dispersibility compared with the dispersion A.

Figure 2:
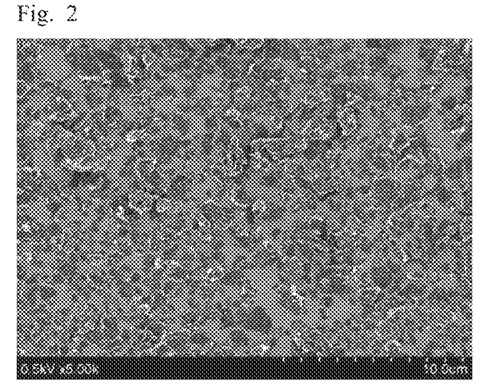
FIG. 2 is an exemplary SEM image of graphene contained in a dispersion B.

Graphene extracted from the dispersion B was observed using a field emission scanning electron microscope (FE-SEM; Hitachi High-Technologies S-4800; acceleration voltage: 0.5 kV). The SEM image is shown in FIG. 2 (magnification: 5000×).

Preparation of Dispersion C Containing Graphene 64 mL of dry NMP and 1.2 g of tritylium tetrafluoroborate (triphenylmethylium tetrafluoroborate; redox potential 0.5 V), which is a carbocation salt of a one-electron oxidant, were added into a planetary ball mill container and dissolved under an argon atmosphere at room temperature in a glove box where the oxygen concentration was adjusted to 3 ppm or less. To this solution, 2 g of the same raw graphene as the one used in the dispersion A and 100 nylon balls ⍉10 mm) were added, then the lid of the container was closed, and the container was removed from the glow box. Subsequently, planetary ball milling (rotation speed: 400 rpm) was performed for 36 hours. Filtration was then performed using a Teflon (registered trademark) membrane filter with a pore diameter of 0.1 μm under pump suction. After filtration, the filter was washed with NMP. The resulting filtrate was added to a NMP solution to have a graphene concentration of 30 mg/mL, which was used as a dispersion C. The average diameter of the dispersion C was measured in the same manner as for the dispersion A. The average diameter was 584 nm with a standard deviation of 95.7, demonstrating that the dispersion C has a smaller average diameter with an improved particle size distribution. The zeta potential was measured in the same manner as for the dispersion A, and was found to be −62 mV, which is 25 mV lower than that of the dispersion A.

The dispersibility index and dispersion stability index of the dispersion C were determined in the same manner as for the dispersion A. The dispersibility index was 0.48, and the dispersion stability index was 0.12, demonstrating that the dispersion C has improved dispersibility and dispersion stability compared with the dispersions A and B.

Figure 3:
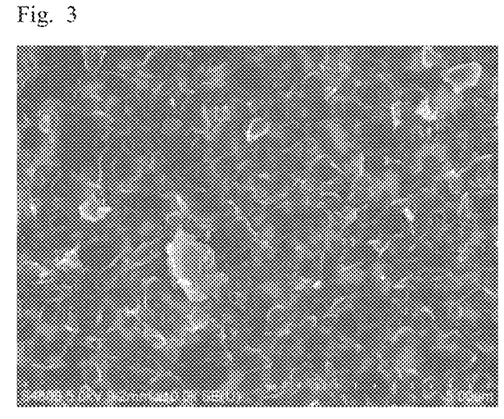
FIG. 3 is an exemplary SEM image of graphene contained in a dispersion C.
Figure 4:
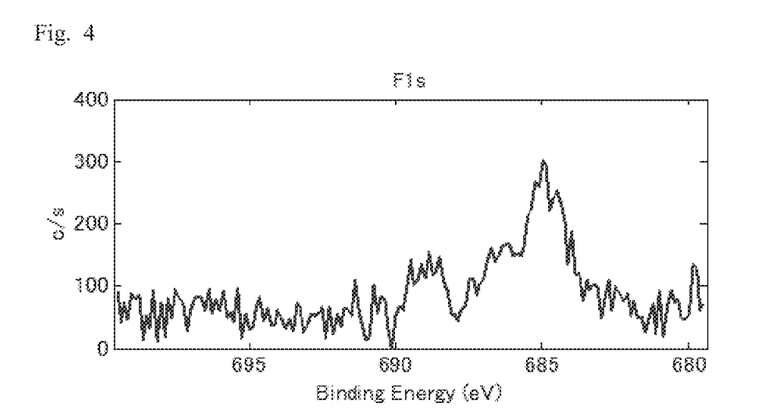
FIG. 4 shows an exemplary result of X-ray photoelectron spectroscopic (XPS) analysis of graphene contained in a dispersion C.

Graphene extracted from the dispersion C was observed using a field emission scanning electron microscope (FE-SEM; Hitachi High-Technologies S-4800; acceleration voltage: 5 kV). The SEM image is shown in FIG. 3 (magnification: 10000×). Also, the graphene extracted from the dispersion C was subjected to X-ray photoelectron spectroscopy (XPS; Quantera SXM, Albac Phi; X-ray source: AlKα; X-ray beam diameter: φ200 μm). As a result, fluorine atoms, which were not detected in the raw graphene, were detected at about 0.3 atomic % of the detected amount of carbon atoms. The XPS chart is shown in FIG. 4. The detected fluorine atoms are believed to originate from the bonding of fluorine with inorganic materials at 685 eV, and are believed to be tetrafluoroborate, the counter anion of the modified graphene.

Preparation of Alkali-Metal-Transition-Metal Composite Oxide

For $D_{10}$, $D_{50}$, and $D_{90}$ of the alkali-metal-transition-metal composite oxide particles, the volume-based cumulative particle size distribution was measured using a laser diffraction particle diameter analyzer (Mastersizer 2000 from Malvern Analytical), and the respective particle diameters were determined as the values corresponding to the cumulative values from the small diameter side. The average particle diameter based on electron microscopy $D_{SEM}$ was determined by selecting 100 particles whose particle outlines were discernible in an image observed at 1000× to 10000× using a scanning electron microscope (SEM), calculating the spherical equivalent diameters of the selected particles using image processing software (ImageJ), and calculating the arithmetic mean of the obtained spherical equivalent diameters as $D_{SEM}$.

Preparation of Alkali-Metal-Transition-Metal Composite Oxide Particles A

Figure 5:
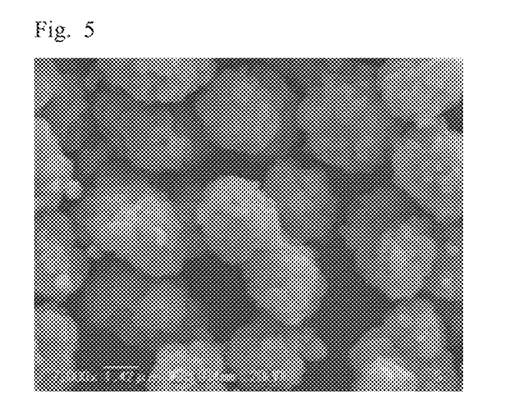
FIG. 5 is an exemplary SEM image of an alkali-metal-transition-metal composite oxide.

According to a known method, the average particle diameter $D_{SEM}$ based on electron microscopy was 0.44 μm, $D_{10}$=3.5 μm, $D_{50}$=7.1 and $D_{90}$=19.7 μm, the ratio of $D_{50}$ to the average particle diameter $D_{SEM}$, or $D_{50}/D_{SEM}$, was 16.1, and the ratio $D_{90}/D_{10}$ in the particle size distribution was 5.6. The alkali-metal-transition-metal composite oxide particles A having an Ni disorder amount of 0.6% and represented by the composition formula: $Li_{1.00}Ni_{0.925}Co_{0.05}Al_{0.025}O_2$ was obtained. The SEM image of the alkali-metal-transition-metal composite oxide particles A (SEM; JEOL JSM-IT100LA; acceleration voltage: 20 kV) is shown in FIG. 5 (magnification: 7000×).

Preparation of Alkali-Metal-Transition-Metal Composite Oxide Particles B

Figure 6:
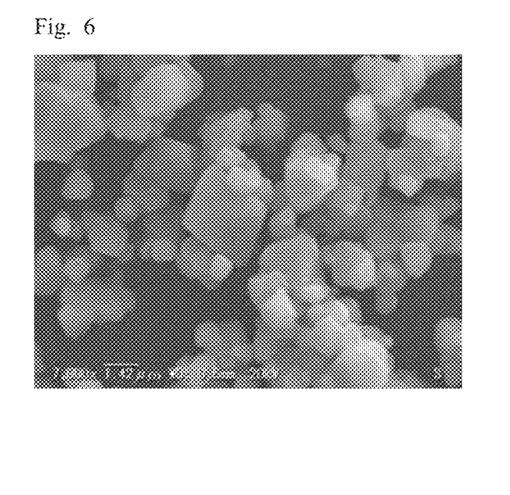
FIG. 6 is an exemplary SEM image of an alkali-metal-transition-metal composite oxide.

The average particle diameter $D_{SEM}$ based on electron microscopy according to a known method was 0.94 μm, $D_{10}$=2.7 μm, $D_{50}$=5.1 μm, $D_{90}$=10.1 μm, and the ratio of $D_{50}$ to the average particle diameter $D_{SEM}$, or $D_{50}/D_{SEM}$, was 5.4, and the ratio $D_{90}/D_{10}$ in the particle size distribution was 3.7. Alkali-metal-transition-metal composite oxide particles B represented by the composition formula: $Li_{1.00}Ni_{0.925}Co_{0.05}Al_{0.025}O_2$ with an Ni disorder amount of 1.1% was obtained. An SEM image (SEM: JEOL JSM-IT100LA; acceleration voltage: 20 kV) of the alkali-metal-transition-metal composite oxide particles B is shown in FIG. 6 (magnification: 7000×).

Production of Positive Electrode

Example 1

Figure 7:
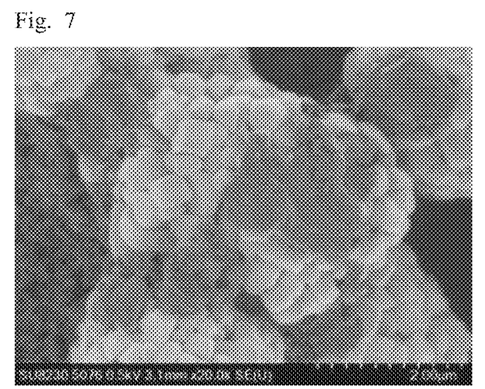
FIG. 7 is an exemplary SEM image of alkali-metal-transition-metal composite oxide particles onto which graphene is adhered in Example 1.

2.1 g of the dispersion B (0.06 gas graphene), 11.6 g of the alkali-metal-transition-metal composite oxide particles A, and 2.65 g of NMP were mixed to obtain a positive electrode active material dispersion liquid. To the positive electrode active material dispersion liquid, 1.5 g of a solution of polyvinylidene fluoride (PVDF) dissolved in NMP (0.12 g as PVDF) was added and mixed, and then 0.9 g of acetylene black (hereinafter also referred to as AB) solution (0.18 g as AB) was further added and mixed to obtain a positive electrode composition. This was mixed with NMP to have a concentration of the positive electrode active material of 52 mass % to prepare an NMP slurry. The NMP slurry was applied to an aluminum foil to be used as the current collector and dried to obtain a dried product. The dried product was compression-molded (density: 3.2 g/cm³) and cut into a predetermined size to prepare a positive electrode of Example 1. Observation of the dried product using an SEM (Hitachi High-Tech SU8230; accelerating voltage: 0.5 KV) demonstrated the existence of a positive electrode active material for a non-aqueous secondary battery in which graphene is adhered onto a part of lithium transition metal composite oxide particles as shown in FIG. 7 (magnification: 20000×).

Example 2

Figure 8:
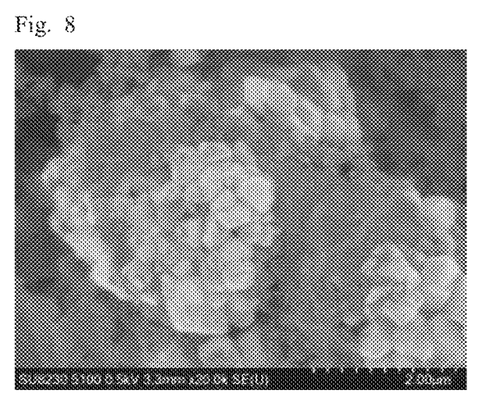
FIG. 8 is an exemplary SEM image of alkali-metal-transition-metal composite oxide particles onto which graphene is adhered in Example 2.

A positive electrode was prepared in the same manner as in Example 1, except that the dispersion C was used instead of the dispersion B. Observation of the dried product using an SEM (Hitachi High-Tech SU8230; accelerating voltage: 0.5 KV) demonstrated the existence of a positive electrode active material for a non-aqueous secondary battery in which graphene is adhered onto a part of lithium transition metal composite oxide particles as shown in FIG. 8 (magnification: 20000×).

Comparative Example 1

Figure 9:
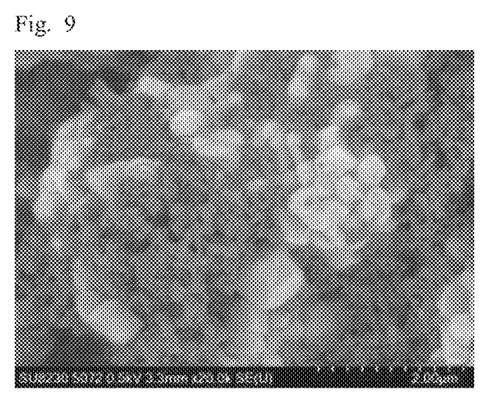
FIG. 9 is an exemplary SEM image of alkali-metal-transition-metal composite oxide particles onto which graphene is adhered in Comparative Example 1.

11.6 g of the alkali-metal-transition-metal composite oxide particles A and 1.5 g of a solution of polyvinylidene fluoride (PVDF) dissolved in NMP (0.12 gas PVDF) were mixed, and then 1.2 g of AB solution (0.24 g as AB) was further added and mixed to obtain a positive electrode composition. This was mixed with NMP to have a concentration of the positive electrode active material of 58 mass % to prepare an NMP slurry. The NMP slurry was applied to an aluminum foil to be used as the current collector and dried to obtain a dried product. The dried product was compression-molded with a roll press machine and then cut into a predetermined size to prepare a positive electrode of Comparative Example 1. An SEM image (Hitachi High-Technologies SU8230; acceleration voltage: 0.5 KV) of the positive electrode observed in the same manner as in Example 1 is shown in FIG. 9 (magnification: 20000×).

Example 3

Figure 10:
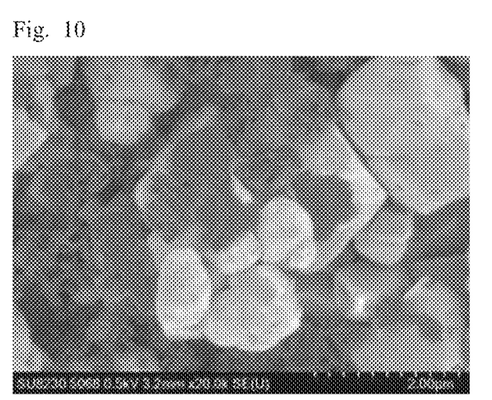
FIG. 10 is an exemplary SEM image of alkali-metal-transition-metal composite oxide particles onto which graphene is adhered in Example 3.

A positive electrode was prepared in the same manner as in Example 1, except that alkali-metal-transition-metal composite oxide particles B was used instead of alkali-metal-transition-metal composite oxide particles A. An SEM image (Hitachi High-Tech SU8230; acceleration voltage: 0.5 KV) of the positive electrode observed in the same manner as in Example 1 is shown in FIG. 10 (magnification: 20000×).

Example 4

Figure 11:
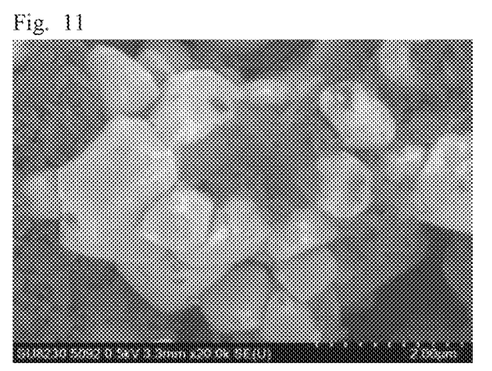
FIG. 11 is an exemplary SEM image of alkali-metal-transition-metal composite oxide particles onto which graphene is adhered in Example 4.

A positive electrode was prepared in the same manner as in Example 3, except that the dispersion C was used instead of the dispersion B. An SEM image (Hitachi High-Tech SU8230; acceleration voltage: 0.5 KV) of the positive electrode observed in the same manner as in Example 1 is shown in FIG. 11 (magnification: 20000×).

Comparative Example 2

Figure 12:
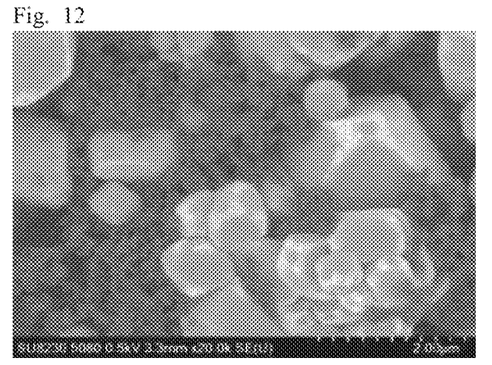
FIG. 12 is an exemplary SEM image of alkali-metal-transition-metal composite oxide particles onto which graphene is adhered in Comparative Example 2.

A positive electrode was prepared in the same manner as in Comparative Example 1, except that alkali-metal-transition-metal composite oxide particles B was used instead of alkali-metal-transition-metal composite oxide particles A. An SEM image (Hitachi High-Technologies SU8230; acceleration voltage: 0.5 KV) of the positive electrode observed in the same manner as in Example 1 is shown in FIG. 12 (magnification: 20000×).

Evaluation

For the positive electrodes of Examples 1 to 3 and Comparative Examples 1 and 2 obtained above, the electrode plate resistance was each measured according to the procedure below. Each electrode plate was placed on a horizontal glass plate, and a probe (Mitsubishi Chemical Analytic MCP-TPAP2) was placed in contact with the electrode plate, and the value of resistance was measured using a tester (Yokogawa M&C Digital Multimeter 7544 02F) (at a temperature of 23° C. in a dry room). For each electrode, ten points were measured, and the average was used as the electrode resistance. The results are shown in Table 1. Table 1 also shows the rate of reduction of the resistances of the examples compared with the comparative examples.

TABLE 1

| | Electrode plate resistance (Ω) | Reduction rate (%) |
|---|---|---|
| Example 1 | 3.1 | 57.6 |
| Example 2 | 2.8 | 61.6 |
| Comparative Example 1 | 7.3 | — |
| Example 3 | 4.3 | 74.4 |
| Comparative Example 2 | 16.8 | — |

Table 1 shows that the electrodes including the positive electrode composition for a non-aqueous secondary battery produced from the dispersion with a high dispersibility index of Examples 1 and 2 have smaller electrode plate resistances than that of Comparative Example 1, and thus the batteries including these electrodes are expected to exhibit improved output characteristics. Also, Example 3 demonstrated a similar effect compared with Comparative Example 2.

Table 1 shows that the electrode of Example 2, which was prepared by using a positive electrode composition for a non-aqueous secondary battery including a dispersion prepared in the presence of a one-electron oxidant with a redox potential of from 0.2 V to 1.9 V, has a higher rate of reduction in electrode plate resistance than that of Example 1. A battery including such an electrode is expected to exhibit a more prominent effect on the output characteristics.

Table 1 shows that the electrode of Example 3, which was prepared by using a positive electrode composition for a non-aqueous secondary battery including alkali-metal-transition-metal composite oxide particles with a ratio of $D_{50}/D_{SEM}$, or a ratio of 50% particle diameter $D_{50}$ in the volume-based cumulative particle size distribution to the average particle diameter $D_{SEM}$ based on electron microscopic observation, of from 1 to 6, has a higher rate of reduction in electrode plate resistance than that of Example 1. A battery including such an electrode is expected to exhibit a more prominent effect on the output characteristics.

Secondary batteries for evaluation were fabricated using the positive electrodes of Examples 2 and 4 and Comparative Examples 1 and 2 according to the procedure below.

Fabrication of Negative Electrode

As the negative electrode active material, a graphite material was used. 97.5 mass parts of the negative electrode active material, 1.5 mass parts of carboxymethyl cellulose (CMC), and 1.0 mass parts of styrene-butadiene rubber (SBR) were dispersed in water and kneaded to prepare a negative electrode paste. The paste was applied to a copper foil current collector and dried. After drying, the paste was compression-molded using a roll press machine, and then cut into a predetermined size to prepare a negative electrode.

Preparation of Non-Aqueous Electrolyte

Ethyl carbonate and methyl ethyl carbonate were mixed in a volume ratio of 3:7 to obtain a mixed solvent. Into the solvent, lithium hexafluorophosphate was dissolved to have a concentration of 1.0 mol % to obtain a non-aqueous electrolyte.

Fabrication of Non-Aqueous Electrolyte Secondary Battery

To the positive and negative current collectors, lead electrodes were each connected, and vacuum-dried at 120° C. A separator formed from porous polyethylene was placed between the positive and negative electrodes, all of which were placed in a laminated pouch pack. This was then vacuum-dried at 60° C. to remove moisture adsorbed on the members. After vacuum drying, the above non-aqueous electrolyte was injected into the laminated pack and sealed to obtain a laminated non-aqueous electrolyte secondary battery for evaluation. Each battery for evaluation was used to evaluate battery characteristics described below.

Evaluation of Charge and Discharge Cycle Characteristics

The batteries for evaluation were placed in a constant temperature chamber set to 45° C., and constant voltage charging was performed at a charge voltage of 4.3 V. After charging, constant voltage discharge was performed at a discharge voltage of 2.75 V and the first cycle discharge capacity Qdcyc (1) was measured. The charge and discharge were repeated, and at the last $200^{th}$ cycle, the discharge capacity Qcyc (200) was measured. By dividing Qcyc (200) by Qcyc (1), the capacity retention rate Pcyc (=Qcyc (200)/Qcyc (1)) (%) after 200 cycles was calculated. The results of Example 2 and Comparative Example 1 are shown in Table 2, and the results of Example 4 and Comparative Example 2 are shown in Table 3.

Evaluation of Output Characteristics

The batteries for evaluation were each charged at a constant current to a charge depth of 50% with a full charge voltage of 4.2 V under the conditions of 25° C. and −25° C., and then pulse charge and discharge was performed at a specific current value i. The pulse charge and discharge was repeated with a cycle of 10 sec application followed by 3 min release. The current values i for the pulse discharge and charge were 0.04 A, 0.08 A, 0.12 A, 0.16 A, and 0.20 A at 25° C., and 0.03 A, 0.05 A, 0.08 A, 0.105 A, and 0.13 A at −25° C. The current values i were plotted on the horizontal axis of the graph and the voltage values V after 10 sec of pulse discharge were plotted on the vertical axis of the graph, and the absolute value of the slope was obtained within the current range where a linear line was maintained in the i-V plot to determine the battery resistances R(25) (Ω) and R(−25) (Ω). The results of Example 2 and Comparative Example 1 are shown in Table 2, and the results of Example 4 and Comparative Example 2 are shown in Table 3. Tables 2 and 3 also show the rate of reduction in battery resistance of the examples relative to the comparative examples.

TABLE 2

|  | Capacity retention rate (%) | Battery resistance R(25) (Ω) | Reduction rate (%) | Battery resistance R(−25) (Ω) | Reduction rate (%) |
| --- | --- | --- | --- | --- | --- |
| Example 2 | 75.7 | 1.33 | 9 | 8.5 | 7 |
| Comparative Example 1 | 72.7 | 1.46 | — | 9.1 | — |

Table 2 demonstrates that the secondary battery of Example 2, which was produced by using a positive electrode composition for a non-aqueous secondary battery prepared from a dispersion with a high dispersibility index, has a higher capacity retention rate and a lower battery resistance, achieving improved durability and output characteristics compared with the battery of Comparative Example 1. The same effects were also observed in Example 4 compared with Comparative Example 2.

TABLE 3

|  | Capacity retention rate (%) | Battery resistance R(25) (Ω) | Reduction rate (%) | Battery resistance R(−25) (Ω) | Reduction rate (%) |
| --- | --- | --- | --- | --- | --- |
| Example 4 | 83.3 | 1.66 | 38 | 9.6 | 22 |
| Comparative Example 2 | 79.2 | 2.69 | — | 12.3 | — |

Table 3 demonstrates that the secondary battery of Example 4, which was produced by using a positive electrode composition for a non-aqueous secondary battery prepared from a dispersion with a high dispersibility index, has a higher capacity retention rate and a lower battery resistance than the battery of Comparative Example 2, achieving improved durability and output characteristics.

Tables 2 and 3 demonstrate that the secondary battery of Example 4, which was produced by using a positive electrode composition for a non-aqueous secondary battery prepared from alkali-metal-transition-metal composite oxide particles with $D_{50}/D_{SEM}$, or a ratio of 50% particle diameter $D_{50}$ in the volume-based cumulative particle size distribution to the average particle diameter $D_{SEM}$ based on electron microscopy, of from 1 to 6, has a greater rate of reduction in battery resistance than the battery of Example 2, achieving more prominent effect in the improvement of output characteristics.

The disclosure of Japanese Patent Application No. 2019-017327 (filing date: Feb. 1, 2019) is incorporated herein by reference in its entirety. All documents, patent applications, and technical standards described herein are incorporated herein by reference to the same extent as in the case where the individual documents, patent applications, and technical standards are specifically and individually noted as being incorporated by reference.

What is claimed is:

1. A method for producing an electrode active material for a non-aqueous secondary battery, the method comprising:
   contacting a dispersion containing graphene and a dispersion medium with alkali-metal-transition-metal composite oxide particles,
   wherein the dispersion has a dispersibility index that is 0.45 or more and a dispersion stability index that is 0.1 or more, and
   wherein the alkali-metal-transition-metal composite oxide particles have a ratio of 50% particle diameter $D_{50}$ in a volume-based cumulative particle size distribution to an average particle diameter $D_{SEM}$ based on electron microscopy, or $D_{50}/D_{SEM}$, in a range of from 1 to 6.

2. The method according to claim 1, wherein the graphene contains 10 atomic % or less oxygen.

3. The method according to claim 1, wherein the graphene has a specific surface area of from 20 $m^2/g$ to 1000 $m^2/g$.

4. The method according to claim 2, wherein the graphene has a specific surface area of from 20 $m^2/g$ to 1000 $m^2/g$.

5. The method according to claim 1, wherein the graphene has an average diameter of 1000 nm or less.

6. The method according to claim 4, wherein the graphene has an average diameter of 1000 nm or less.

7. The method according to claim 1, further comprising dispersion-treating raw graphene having an average diameter exceeding 1000 nm in a composition containing a solvent having a donor number of 30 or less to obtain the dispersion containing graphene.

8. The method according to claim 6, further comprising dispersion-treating raw graphene having an average diameter exceeding 1000 nm in a composition containing a solvent having a donor number of 30 or less to obtain the dispersion containing graphene.

9. The method according to claim 1, further comprising dispersion-treating raw graphene having an average diameter exceeding 1000 nm in a composition containing a solvent having a surface tension of 50 mN/m or less to obtain the dispersion containing graphene.

10. The method according to claim 8, wherein the solvent has a surface tension of 50 mN/m or less.

11. The method according to claim 7, wherein the composition in the dispersion-treating contains a one-electron oxidant with an oxidation-reduction potential of from 0.2 V to 1.9 V.

12. The method according to claim 8, wherein the composition in the dispersion-treating contains a one-electron oxidant with an oxidation-reduction potential of from 0.2 V to 1.9 V.

13. The method according to claim 9, wherein the composition in the dispersion-treating contains a one-electron oxidant with an oxidation-reduction potential of from 0.2 V to 1.9 V.

14. The method according to claim 10, wherein the composition in the dispersion-treating contains a one-electron oxidant with an oxidation-reduction potential of from 0.2 V to 1.9 V.

15. The method according to claim 1, wherein the alkali-metal-transition-metal composite oxide particles have a ratio of 50% particle diameter $D_{50}$ in a volume-based cumulative particle size distribution to an average particle diameter $D_{SEM}$ based on electron microscopy, or $D_{50}/D_{SEM}$, in a range of from 1 to 6,
   contain nickel, and
   have a layered structure.

16. The method according to claim 6, wherein the alkali-metal-transition-metal composite oxide particles have a ratio of 50% particle diameter $D_{50}$ in a volume-based cumulative particle size distribution to an average particle diameter $D_{SEM}$ based on electron microscopy, or $D_{50}/D_{SEM}$, in a range of from 1 to 6, contain nickel, and have a layered structure.

17. The method according to claim 12, wherein the alkali-metal-transition-metal composite oxide particles have a ratio of 50% particle diameter $D_{50}$ in a volume-based cumulative particle size distribution to an average particle diameter $D_{SEM}$ based on electron microscopy, or $D_{50}/D_{SEM}$, in a range of from 1 to 6, contain nickel, and have a layered structure.

18. The method according to claim 14, wherein the alkali-metal-transition-metal composite oxide particles have a ratio of 50% particle diameter $D_{50}$ in a volume-based cumulative particle size distribution to an average particle diameter $D_{SEM}$ based on electron microscopy, or $D_{50}/D_{SEM}$, in a range of from 1 to 6, contain nickel, and have a layered structure.

19. The method according to claim 1, wherein the dispersion containing graphene further comprises a dispersant.

20. The method according to claim 1, wherein the dispersion comprises positive hole-doped graphene and an anion that forms a charge pair with it.

21. The method according to claim 1, wherein the dispersion comprises modified graphene having a zeta potential of −50 mV or less in N-methyl-2-pyrolidone.

\* \* \* \* \*